J. O. KING.
SPRING FISH-HOOK.
No. 190,222
Patented May 1, 1877.
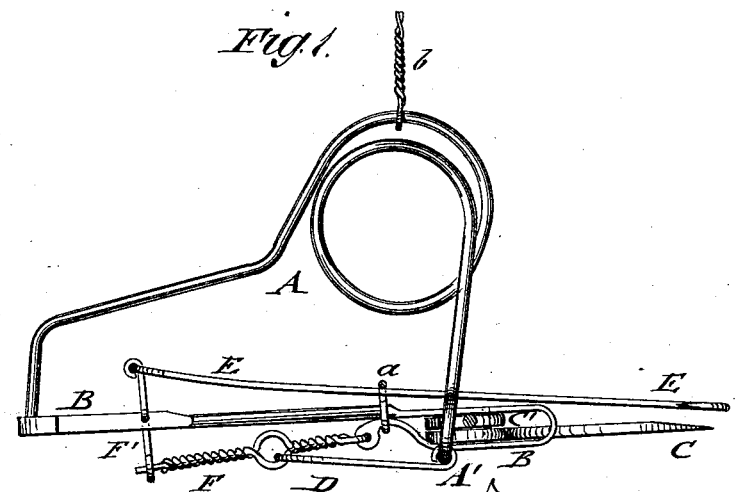
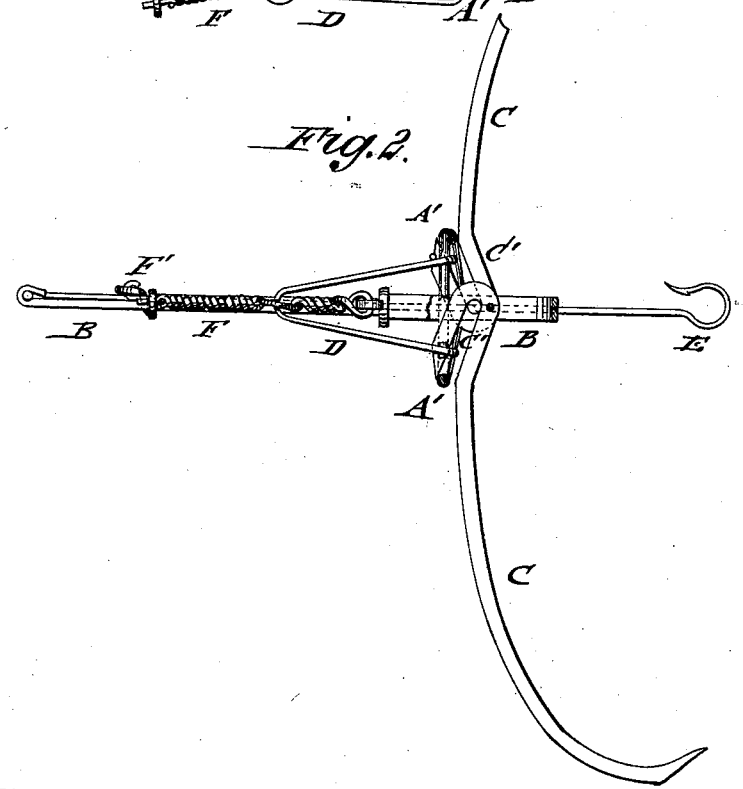
WITNESSES:
Francis McArdle,
J. H. Scarborough.
INVENTOR:
J. O. King
BY
ATTORNEYS.

UNITED STATES PATENT OFFICE.

JOHN O. KING, OF ALTAMONT, KANSAS.

IMPROVEMENT IN SPRING FISH-HOOKS.

Specification forming part of Letters Patent No. 190,222, dated May 1, 1877; application filed April 2, 1877.

*To all whom it may concern:*

Be it known that I, JOHN O. KING, of Altamont, in the county of Labette and State of Kansas, have invented a new and Improved Spring Fish-Hook, of which the following is a specification:

In the accompanying drawing, Figure 1 represents a side elevation, and Fig. 2 a top view, of my improved spring fish-hook, shown in position to be sprung.

Similar letters of reference indicate corresponding parts.

This invention relates to that class of fish-hooks which are sprung when the fish tampers with the bait, so as to close and catch the same; and it consists of fulcrumed grab-hooks having outer claws and U-shaped ends back of the fulcrum, in connection with a sliding loop at the end of a coiled hook-actuating spring, the hooks being opened by a swinging trip-lever, connected by a link to the spring-loop, and set to a fulcrumed latch of the sliding and guided bait-hook.

In the drawing, A represents a strong spiral spring, that is attached at one end, in a fixed manner, to the center piece B, to the opposite end of which the grab-hooks C are fulcrumed.

The front end of the spiral spring A is extended in the shape of a loop, A', around the ends of the grab-hooks C, near the fulcrum, and connected by a pivot-link, D, with a swinging lever, F, pivoted to the center part B.

The grab-hooks C are provided at the outer ends with sharp claws, and at the inner ends with U-shaped bends C', that extend back of the fulcrum, and serve for the entrance of the loop A', so as to spread the grab-hooks into open position by pulling the lever F in backward direction.

The trip-lever F may be made of twisted wire, or of other material, and is set into a hook-shaped or notched latch, F', that is fulcrumed to the rear part of center piece B. The upper end of the latch F' is pivoted to the rear end of the bait-hook E, that is guided in a fixed band or staple, a, of the center piece, so as to be drawn back when the trip-lever is set to the latch, and drawn forward when the fish takes the bait.

The forward pulling of the bait-hook releases instantly the trip-lever, and closes the grab-hooks by the action of the loop of the spiral spring, so as to take hold of the fish.

The hook is suspended in horizontal position, the line being attached to the spiral spring A by a loose link, b. When the hook is set, the parts of the same are nicely balanced in horizontal position on the suspension-link b, being ready to be sprung as soon as the fish takes the bait.

The lever facilitates the easy setting of the spring-hook to the latch, while the powerful action of the spring secures the catching of the fish as soon as the trip-lever is released.

Having thus described my invention, I claim as new and desire to secure by Letters Patent—

1. The combination of the fulcrumed grab-hooks, having U-shaped extensions back of the fulcrum, with the encircling loop of an actuating spiral spring, to open or close the grab-hooks, substantially as shown and specified.

2. The combination of the fulcrumed and spring-acted grab-hooks E with a swinging trip-lever, F, connected with the actuating spring-loop A' of the hooks, and with the latch-piece F' of the sliding bait-hook E, substantially in the manner specified.

JOHN O. KING.

Witnesses:
WILLIAM K. BAKER,
JONES R. BAKER.